United States Patent [19]

Dresen et al.

[11] Patent Number: 4,592,583
[45] Date of Patent: Jun. 3, 1986

[54] TRUCK CARGO BED LINER

[75] Inventors: William L. Dresen, Baraboo; William F. Price, Portage; Phillip L. Emery, Portage; Harlan W. Breezer, Portage, all of Wis.

[73] Assignee: Penda Corporation, Portage, Wis.

[21] Appl. No.: 608,341

[22] Filed: May 8, 1984

[51] Int. Cl.⁴ .............................................. B62D 33/00
[52] U.S. Cl. ................. 296/39 R; 224/42.42
[58] Field of Search .......................... 296/39 R, 37.6; 105/423; 224/42.42 R

[56] References Cited

U.S. PATENT DOCUMENTS

| D. 259,928 | 12/1978 | Weis et al. | D12/98 |
|---|---|---|---|
| 3,652,123 | 3/1972 | Speers | 296/39 R |
| 3,814,473 | 6/1974 | Lorenzen, Jr. | 296/39 R |
| 3,881,768 | 5/1975 | Nix | 296/39 R |
| 4,047,749 | 9/1977 | Lambitz et al. | 296/39 R |
| 4,161,335 | 7/1979 | Nix et al. | 296/39 R |
| 4,162,098 | 7/1979 | Richardson, III | 296/39 R |
| 4,181,349 | 1/1980 | Nix et al. | 296/39 R |
| 4,245,863 | 1/1981 | Carter | 296/39 R |
| 4,279,439 | 7/1981 | Cantieri | 296/39 R |
| 4,333,678 | 6/1982 | Munoz et al. | 296/39 R |
| 4,336,963 | 6/1982 | Nix et al. | 296/39 R |
| 4,341,412 | 7/1982 | Wayne | 296/39 R |
| 4,505,508 | 3/1985 | Carter et al. | 296/39 R |

Primary Examiner—Robert R. Song
Attorney, Agent, or Firm—Isaksen, Lathrop, Esch, Hart & Clark

[57] ABSTRACT

A pickup truck cargo bed liner is disclosed which is particularly constructed for efficiency in shipment and storage, and so that the liner can easily be installed in trucks having top caps. The truck bed liner has a liner bottom wall adapted to fit on and substantially cover the full width of the truck cargo bed floor, the liner bottom wall having a width substantially as great as the width of the truck rear opening. Two liner wheel wells are formed in the liner bottom wall at opposite sides thereof and adapted to accommodate the truck cargo bed rear wheel wells. A liner front wall is connected to and extends upwardly from the liner bottom wall, the liner front wall having an upper margin adapted to fit snugly against the truck cargo bed front wall. Two liner side walls are connected to the liner bottom wall and wheel wells and the liner front wall at opposite sides thereof, the liner front wall substantially limiting the distance between the liner side walls at the front end of the liner. Each liner side wall projects upwardly from the liner bottom wall and adjacent wheel well and has an upper margin which fits snugly against the corresponding truck cargo bed wall beneath the corresponding truck cargo bed side rail, thereby providing an optimum volume of usable cargo space. The liner side walls are inclined outwardly from the liner bottom wall and permit multiple nesting of identical truck cargo bed liners in space efficient relation wherein the bottom walls of the nested liners are in proximity.

21 Claims, 6 Drawing Figures

TRUCK CARGO BED LINER

FIELD OF THE INVENTION

This invention relates to molded plastic protective liners for pickup truck cargo beds.

DESCRIPTION OF THE PRIOR ART

Pickup trucks have been used for many years as working vehicles. In recent years pickup trucks have become increasingly popular as family transportation vehicles, because of their dual ability to haul passengers and cargo. The cargo bed surfaces of pickup trucks are generally finished with paint by the manufacturer. If the painted surfaces are unprotected, they can be scratched from cargo impact or deteriorated by weather or corrosives, seriously detracting from the value of the trucks. Whether a pickup truck us used as a working vehicle or as a family transportation vehicle, it is important to keep the surface of the cargo bed in a satisfactory condition.

Various cargo bed liners used to protect the surface of cargo beds are described in prior art patents. One-piece molded plastic truck liners comprising a front wall, opposing side walls and a bottom wall are shown in U.S. Pat. No. 4,341,412 to Wayne, U.S. Pat. No. 4,336,963 to Nix, et al, U.S. Pat. No. 4,181,349 to Nix, et al, U.S. Pat. No. 4,047,749 to Lambitz, and U.S. Pat. No. 3,814,473 to Lorenzen. All of the above patents show liners with side wall flanges that fit over the side rails of the truck's side walls, with liner side walls extending substantially perpendicularly downward to the liner floor in substantially spaced relation to the side walls of the truck. Most of the above patents show a liner front wall flange which fits over the front rail of the truck front wall.

Another type of protective insert for pickup truck cargo beds is illustrated by U.S. Pat. No. 4,245,863 to Carter. This patenht relates exclusively to three-layer, vertical liner side walls attached to the truck walls by strips of magnetic tape or velcro. The Carter patent does not disclose a means to protect the surface of the floor of the truck cargo bed.

Storage and shipment of the prior art box-like cargo bed liners has also been a problem. As illustrated in the Lorenzen patent, liners with substantially perpendicular side walls and side wall flanges cannot be densely stacked with bottom walls in close proximity to each other. Therefore, the number of such liners which can be nested together for shipment is limited. Separate, bulky wooden spacer frames have been found necessary in order to partially nest some cargo bed liners.

Another problem which occurs with the prior art one-piece molded liners is the loss of usuable cargo space between the side walls of the liner and the side walls of the truck. This decrease in cargo space is illustrated by the space h-1 and h-2 shown in Wayne, FIG. 8.

The need for a secure cargo space in pickup trucks and increasing use of top caps on pickup trucks has caused yet a third problem with the prior art one-piece molded truck liners. Top caps fastened to the truck side rails enclose the truck cargo bed in a manner similar to a station wagon cargo area. Often, pickup trucks are purchased with an installed top cap. It is not convenient to install one of the protective cargo bed liners disclosed in the prior art in a truck equipped with a top cap. The prior art liner side walls prevent access to the underside of the truck rails and make attachment of the top cap and liner side wall flanges on the truck rails with conventional bolt and nut fasteners impractical.

Therefore, a need has existed to provide a one-piece protective cargo bed liner which allows for efficient shipping and storage, provides optimum cargo space, and can be conveniently installed in pickups fitted with top caps without interference or contact with the top cap fastening means.

SUMMARY OF THE INVENTION

The present invention is summarized in a protective truck bed liner adapted to closely fit the contours of a truck cargo bed. The truck bed liner has a liner bottom wall adapted to fit on and substantially cover the full width of the truck cargo bed floor, the liner bottom wall having a width substantially as great as the width of the truck rear opening. Two liner wheel wells are formed in the liner bottom wall at opposite sides thereof and adapted to accommodate the truck cargo bed rear wheel wells. A liner front wall is connected to and extends upwardly from the liner bottom wall, the liner front wall having an upper margin adapted to fit snugly against the truck cargo bed front wall. Two liner side walls are connected to the liner bottom wall and wheel wells and the liner front wall at opposite sides thereof, the liner front wall substantially limiting the distance between the liner side walls at the front end of the liner. Each liner side wall projects upwardly from the liner bottom wall and adjacent wheel well and has an upper margin which fits snugly against the corresponding truck cargo bed wall beneath the corresponding truck cargo bed side rail, thereby providing an optimum volume of usable cargo space. The liner side walls are inclined outwardly from the liner bottom wall and permit multiple nesting of identical truck cargo bed liners in space efficient relation wherein the bottom walls of the nested liners are in proximity.

It is an object of the present invention to provide a truck cargo bed liner which can be efficiently stored and shipped, and which can be easily installed in a truck cargo bed to provide up to ten percent more useable cargo space than prior art over-the-side-rail cargo bed liners.

It is a still further object of the present invention to provide truck cargo bed liner which can easily be installed in a pickup truck having a top cap without engaging or limiting access to the top cap fastening means, so as to provide a protective lining in a truck having a secure cargo hold area.

Other objects, advantages and features of the present invention will become apparent from the following description of the preferred embodiment of the invention in conjunction with the accompanying drawings.

DESCRIPTION OF THE PREFERRED EMBODIMENT

Figure 1:
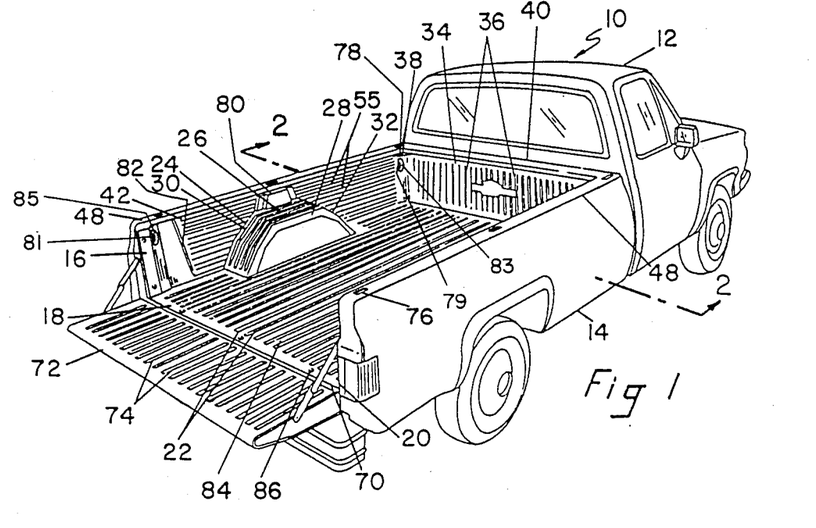
FIG. 1 is a perspective view of a cargo bed liner of the present invention installed in a pickup truck.

FIG. 1 illustrates a conventional pickup truck 10 having a cab 12 and a truck cargo bed 14. A preferred embodiment of the protective truck cargo bed liner 16 of the invention is installed within the truck cargo bed 14.

Figure 2:
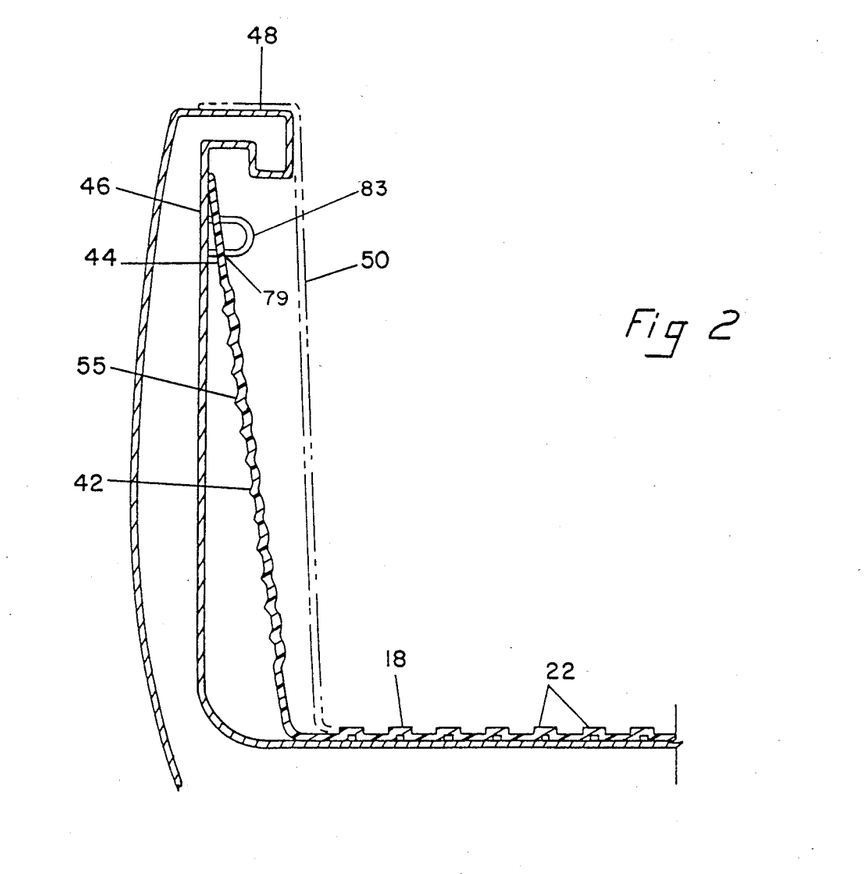
FIG. 2 is a fragmentary sectional view taken substantially along line 2—2 of FIG. 1.

The truck bed liner 16 is formed of high density polyethylene in a single, integral unit, and has a liner bottom wall 18 which is adapted to fit on and substantially cover the full width of the truck cargo bed floor. The liner bottom wall 18 will normally have a width substantially as great as the distance between the truck side rails. As shown in FIG. 2, the liner bottom wall 18 contains a plurality of separate, inverted U-shaped longitudinal corrugations 22. The bottom wall 18 also has a planar apron portion 70 at its rear margin which is adapted to fit snugly against the truck cargo bed floor adjacent the rear access opening 20 to keep foreign material from entering between the liner and the truck bed.

The truck bed liner 16 also has two liner wheel wells 24 formed in the liner bottom wall 18 at opposite sides thereof. The liner wheel wells 24 are adapted to accomodate the truck cargo bed rear wheel wells (not shown). The liner wheel wells 24 have a top wall 26, inside wall 28, and two opposing end walls, one end wall 30 facing backward to the truck rear opening and one end wall 32 facing forward to the cab 12. In the preferred embodiment, the forward-facing end wall 32 is preferably inclined at least approximately 23° from perpendicular for reasons to be described. The inside wall 28 is inclined at an angle of only approximately 2° to 5° from perpendicular to facilitate nesting as more fully described below, while still maximizing the distance between the liner wheel wells to accomodate wide loads.

A liner front wall 34 is connected to and extends upwardly from the liner bottom wall 18. As shown in FIG. 1, the liner front wall 34 contains a plurality of vertically extending corrugations 36 which will be described in more detail below. The liner front wall 34 has an upper margin 38 adapted to fit snugly against the truck cargo bed front wall underneath the truck front rail 40.

Two liner side walls 42 are connected to the liner bottom wall 18 and wheel wells 24 and also the liner front wall 34 at opposite sides thereof. The liner front wall 34 substantially fixes and limits the distance between the liner side walls 42 at the front end of the liner 16. As shown in FIGS. 1 and 2, each liner side wall 42 projects upwardly and outwardly from the liner bottom wall 18 and adjacent liner wheel well 24 at an angle of approximately 5° to 12° from perpendicular for reasons to be described. Each liner side wall 42 has an upper margin 44 which fits snugly against the corresponding truck cargo bed wall 46 beneath the corresponding truck cargo bed side rail 48. The upper margin 44 is preferably substantially co-planar with the liner side wall 42 and devoid of any substantial transverse flange to permit the side wall 42 to fit flush against the cargo bed wall 46, and also to permit the liner side walls 42 to bend outwardly in a limited manner, whereby the spacing of the side walls 42 near the front of the liner will be maintained by the attached front liner wall 34, but more rearwardly portions of the liner side wall 42 will be permitted to open outwardly a limited amount when not restrained within the truck cargo bed to facilitate full nesting of the liner with identical liners. Such limited outward opening of the liner side walls 42 permits use of the more vertical liner wheel well inside walls 28 without sacrificing the full nesting capabilities of the liner, because the inclination of the wheel well inside walls 28 increases as the side walls 42 open outwardly.

The particular geometry of the inclined liner side walls 42 of the present invention provides an optimum volume of usable cargo space in comparison to the prior art cargo bed liners having substantially perpendicular side walls as illustrated at phantom line 50 in FIG. 2. The present invention realizes a gain of up to approximately 10% in usable cargo space over the cargo space available with the prior art cargo bed liners. In addition, the out-of-sight location of the liner side wall upper margin 44 is a distinct advantage as any slight irregularities in the extended upper margin 44 will not detract from the appearance of the installed unit.

Figure 3:
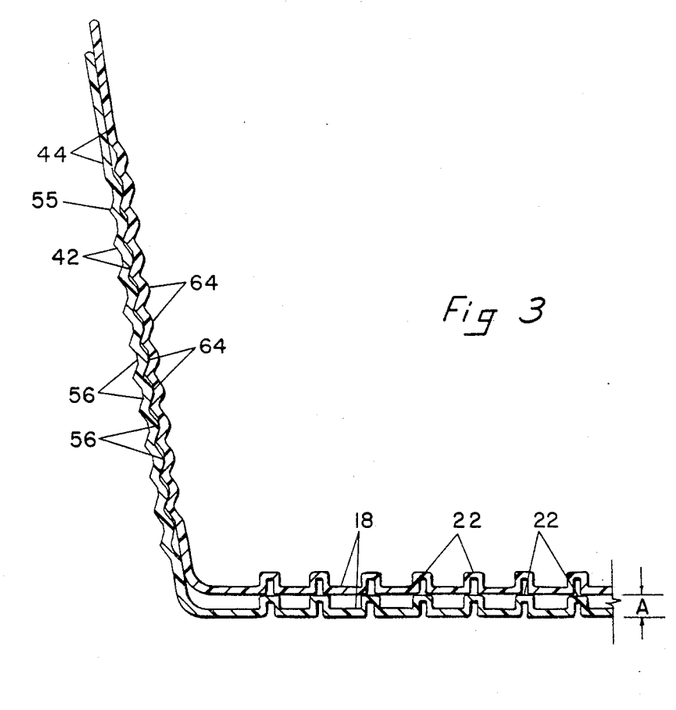
FIG. 3 is a fragmentary section view taken along the same section line as FIG. 2 through nested cargo bed liners positioned for shipment or storage.

FIG. 3 illustrates a fragmentary vertical section of two nested cargo bed liners of the present invention. The bottom walls of the nested liners are seen to be in direct contact, comprising a fully nested condition. The maximum bottom surface to top surface thickness of the bottom wall corrugations 22 (distance A) can preferably be as little as ⅜ inch; therefore, it can be seen that each successive liner which is added to the nest only increases the height of the nest by approximately ⅜ inch. This close nesting of liners provides a significant advantage for storage and/or shipment of liners. For example, it has been found that 100 full size truck cargo liners of the invention can be nested in a single stack which is only approximately 83 inches high at the highest point on the walls of the top nested liner. Therefore, a large inventory of liners can be stored in a relatively small space indoors, and can be conveniently moved and handled on pallets. The close nesting allows approximately 500 liners to be shipped on one conventional truck semi-trailer.

In contrast, because of substantially perpendicular side walls and side wall flanges, the prior art liners could not be nested or stacked with as great efficiency, which meant either that liner inventory was limited in order to conserve space indoors, or that a large inventory of liners was kept outdoors, which is undesirable as the liners are then susceptible to damage and theft, and will pick up dirt and require thorough cleaning before delivery to a customer. Shipment of the prior art liners has also been less efficient.

The close nesting characteristics of the present liners have been accomplished by the unique design of the liner side walls 42. Previous cargo bed liners with over-the-rail flanges and inside-the-rail side walls have been molded with side walls as vertical as possible (some slight incline is normally necessary to facilitate release of the part from the mold) to avoid loss of cargo capacity, as any substantial incline of the side wall would result in a bottom wall width substantially more narrow than the distance between the truck side rails. Furthermore, broad, flat molded panels such as liner side walls 42 require ribbing or other design reinforcement having dimensions transverse to the plane of the panels to provide strength and resistance to lateral forces, to prevent warping and longitudinal distortion of the panel, and to break up sight lines so that any concave or convex irregularities in the surface are not as visible. For example, see Wayne U.S. Pat. No. 4,336,963. However, transversely extending reinforcing structures interfere with nesting capabilities.

Accordingly, the liner side walls 42 of the present cargo bed liner 16 can be seen to depart from prior art side wall design in several important respects. The liner side walls 42 extend upwardly and outwardly from a full width bottom wall 18 to maximize the interior capacity of the liner 16. The liner side walls 42 are corrugated in a novel manner which permits full bottom wall-to-bottom wall nesting of a plurality of liners, even though the side walls 42 incline from the liner bottom wall 18 and adjacent liner wheel well 24 at an angle of approximately 5° to 12° from perpendicular. The preferable side wall angle of inclination is 8° 30", because of the proximity of the cargo bed side walls 46 which limit the inclination of the liner side walls 42 in use. Each liner side wall 42 has a plurality of adjacent longitudinally extending corrugations 55, each of which corrugations 55 have a vertical height F equal to the thickness of the bottom wall 18 to permit the corrugations 55 of each liner side wall to engage similar successive corrugations 55, once removed, of adjacent liners as the nested liners are placed in bottom wall-to-bottom wall nesting abutment. While nested, successive liners are supported primarily by the engaged bottom walls 18, and only secondarily by the engaged side wall corrugations 55. The corrugations further are designed to provide required lateral stiffness and resistance to bending stresses with minimal transverse dimensions, the depth of the corrugations not substantially exceeding the thickness of the liner side wall material, further facilitating dense nesting.

Figure 4:
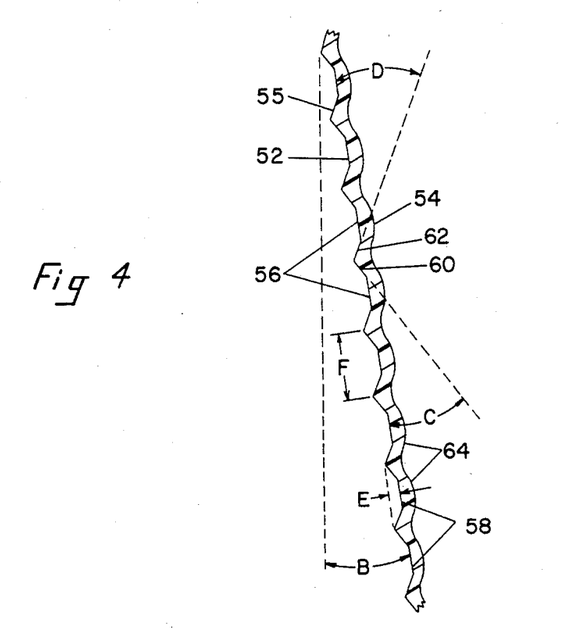
FIG. 4 is an enlarged fragmentary sectional view of the left-hand side of the cargo bed liner taken along the same section as FIG. 2.

The structure of the liner side wall corrugations 55 will be discussed more specifically with reference to FIG. 4. In order to achieve a desired ⅝ inch nest, the preferred angle of side wall projection, indicated at B in FIG. 4, should be about 8° 30'. The liners are manufactured through a vacuum thermoforming process. In that process, the thermoforming vacuum mold is a one-sided mold having vacuum ports provided therein intended to draw the sheet of material against the mold with the sheet of material being heated so as to generally conform to the shape of the mold. The thermoform process results in liner side walls which have two surfaces of slightly different shape. The outside surface of the liner side wall is the side which is adjacent to the mold, as indicated at 52 in FIG. 4. The inside surface of the liner side wall is indicated at 54 in FIG. 4. The thermoformed vacuum mold imparts the shape seen as outside surface 52 of the liner. Outside surface 52 is comprised of a series of three-edged corrugations 56. Middle edges 58 run along a line which is preferably at an 8° 30' angle from the perpendicular, as indicated at B. Edges 60 of the three-edged corrugations are constructed so as to achieve an angle C of approximately 30° with respect to the plane represented by middle edges 58. Edges 62 of the three-edged corrugations are constructed so as to achieve an angle D of approximately 30° with respect to the plane represented by middle edges 58. The edges 60 and 62 intersect to define the margin between adjacent corrugations. The depth of each three-edged corrugation 56, represented at E, is approximately ⅛ inches. The vertical height F of each three-sided corrugation 56 is approximately ⅝ inches. The inside surface 54 of each liner side wall 42 contains a plurality of adjacent scalloped, longitudinally extending corrugations 64 which generally, but in a more rounded manner, conform to the molded shape of the outside surface 52 as a natural result of the vacuum-forming process. A liner formed with this particular geometry will achieve a ⅝ inch nest as measured between the bottom walls 18 of adjacent, nested liners.

The above-described ⅝ inch nest is further facilitated by providing corrugations 36 in the front wall 34 which are identical to corrugations 56 in the side walls 42, except that the front wall corrugations extend vertically. The corrugations 36 are thus of approximately ⅛ inch depth which allows nesting of the liners with only approximately ¼ inch set back of the front wall 34 of each successively nested liner. In addition, the appearance of the corrugated front wall 34 is esthetically harmonious with the side walls 42.

It can be seen from FIG. 1 that pick-up cargo beds may have two or three stake channels 76 spaced along each side rail 48, one at each end and sometimes one at the mid-point. These stake channels 76 are typically rectangular steel channels which extend vertically downward from the top of the side rails 48 to the floor of the cargo bed, for the purpose of receiving stakes of wood or other material supporting vertically extending sides for increasing the load-containing capabilities of the truck cargo bed. Because the cargo bed liner 16 of the invention extends under the truck side rails 48 all the way to the truck cargo bed side walls, the stake channels 76 would interfere with the liner side walls 42 unless means are provided to accommodate the stake channels 76. The liner side walls 42 intended for use in cargo beds with stake channels 76 each include a front pocket 78, a rear pocket 82, and, if required, a side pocket 80. These side wall pockets 80 extend each side wall 42 inwardly a sufficient distance to permit it to pass around the stake channels 76 while permitting the remainder of the side wall 42 to extend outwardly to engage the truck side wall 46. The configuration of the side wall pockets 78, 80 and 82 may vary, although preferably the pockets are located and shaped to accommodate the differing stake channels of different truck cargo bed manufacturers. The front pocket 78 and rear pocket 82 may have respective openings 79 and 81 to accomodate respective truck side wall loops 83 and 85 so that loops 83 and 85 can be used to anchor ropes to tie down cargo. As with the liner side wall and wheel well surfaces, it is necessary to incline the surfaces of the pockets to permit full nesting of the liners. Accordingly, inwardly facing surfaces of the front pockets 78 preferably are inclined outwardly at 8° 30" beyond perpendicular. Because of the flexibility of the liner side walls 42, inwardly facing surfaces of the side pockets 80 are only inclined outwardly 2° to 5° beyond perpendicular, and inwardly facing surfaces of the rear pockets 82 may be perpendicular. Front facing surfaces of the side pockets 80 and rear pockets 82, however, preferably incline rearwardly at least 23° beyond perpendicular to permit full nesting of the rearwardly set-back nested liners.

Figure 5:
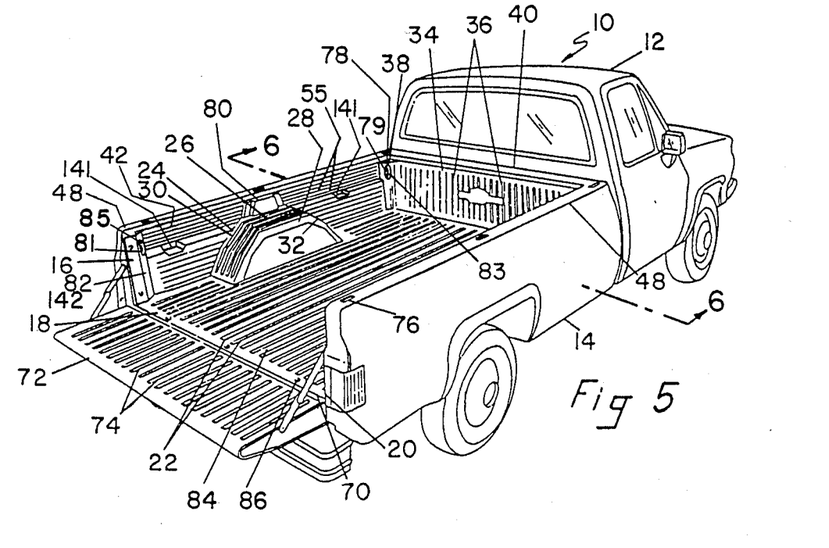
FIG. 5 is a perspective view of an alternate embodiment of a cargo bed liner of the present invention installed in a pickup truck.
Figure 6:
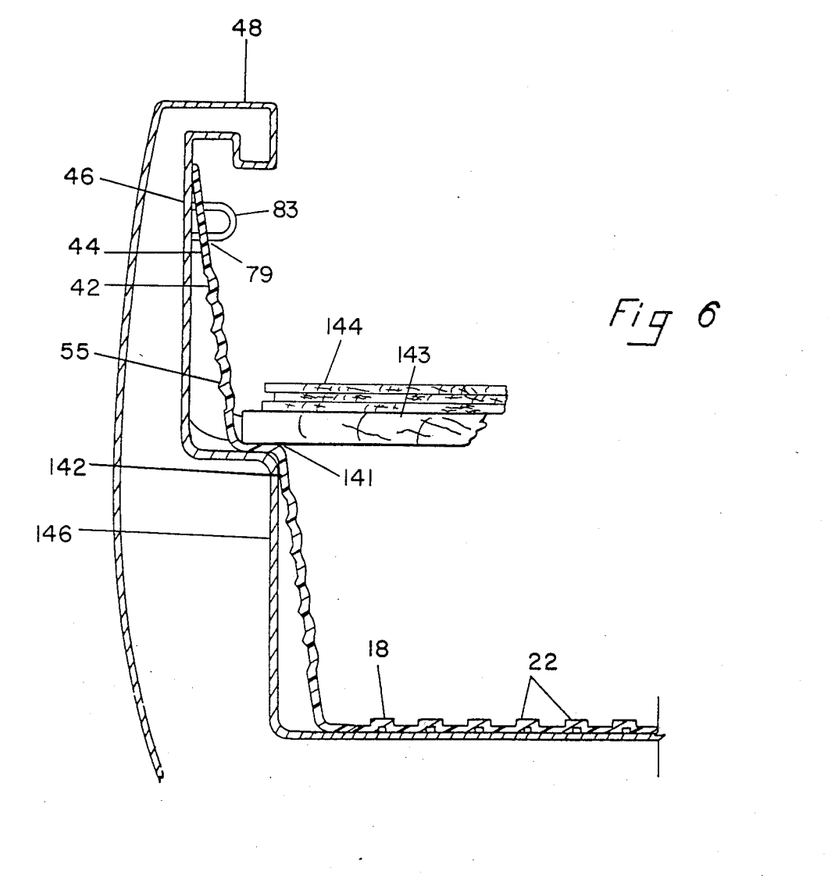
FIG. 6 is a fragmentary sectional view taken substantially along line 5—5 of FIG. 5.

FIGS. 5 and 6 illustrate an alternate embodiment of the cargo bed liner of the present invention. As shown in FIG. 6, some pickup trucks have outwardly stepped side walls 146. To accomodate such side walls, the cargo bed liner shown in FIGS. 5 and 6 has an outwardly stepped portion 142, with side wall portions above and below the outwardly stepped portion being inclined and corrugated in the same manner as the side walls 42 of the liner of FIGS. 1-4. A pair of concave pockets 141 are provided on the outwardly stepped portion 142 which fit within similar pockets on the truck cargo walls to accomodate structural boards 143 which may be extended across the liner so that flat sheets of material 144 substantially as wide as the cargo bed may be supported on top of the structural boards 143 and liner wheel wells 24.

When the liners of the invention are nested, the substantially vertical front wall 34 of each liner necessarily has a setback of approximately ¼ inch from the front wall 34 of the liner directly underneath. The 23° rearward inclination of the front facing surfaces of the side pockets 80 and rear pockets 82 accomodates the ¼ inch setback and still permits full nesting of the liner. As discussed above, the liner front wall 34 substantially limits the distance between the liner side walls 42 near the front end of the liner. There is no such limitation of the distance between the side walls 42 at the rear access opening 20 of the liners. Therefore, as previously noted, the nested liners will have a tendency to open up slightly towards the rear access opening end of the liner. The 2° to 5° tilt of the inside walls 28 of the liner wheel wells 24 will thereby be sufficiently increased to permit full nesting of the liners.

The inside surfaces of the cargo bed liner of the present invention may be provided with an integral anti-slip, frictional coating 84 of material. Such a coating of material having a high coefficient of friction will inhibit movement of material placed upon the upper surface of the liner during use. The coating 84 may be advantageously provided by laminating a film to the upper surface of the high density polyethylene sheet during extrusion forming of the sheet prior to vacuum forming the liner from the sheet. Suitable materials capable of being bonded to polyethylene and providing such a non-skid surface include a variety of ethylene ethyl acetate (EEA), ethylene vinyl acetate (EVA), thermoplastic rubber (TPR), Saranex, and a modified polyolefin elastomer sold under the trademark REN-FLEX by the Ren Plastics Company. It has been found that most preferable to adhere a film of between 10 and 30 thousandths of an inch, such as 15 thousandths thick film, of REN-FLEX to the upper surface of the polyethylene by co-extrusion. The film of any of the above materials may also be caused to adhere to the polyethylene surface by use of adhesives or a thermal attachment process.

The liner 16 is installed by simply inserting it into the truck cargo bed 14, positioning the top margins 44 of the side walls 42 snugly against the truck side wall 46 underneath the truck side rail 48, and securing the liner in place by means of fasteners 86. Typically, holes will be drilled through the liner and the cargo bed at several selected locations, and frictional plastic fasteners or metal screws inserted in the holes to secure the liner. Because the liner and fasteners do not engage the truck side rails 48, it is very simple to install the truck liner of the present invention in a truck which has its side rails and cargo bed covered with a top cap.

A separate one-piece tailgate liner 72 may also be attached to the tailgate of the truck in a conventional manner. The tailgate liner 72 has inverted U-shaped, corrugations 74 which are vertically extending when the tailgate is closed. The corrugations 74 are similar to the corrugations 22 of the liner bottom wall.

It is seen that the invention is distinguished by a one-piece molded protective truck cargo bed liner which can achieve a full nest with similar liners having a liner-to-liner spacing of as little as ⅝ inch and therefore can be efficiently stored and shipped, and which can also provide up to ten percent more cargo space than prior art cargo bed liners. The truck cargo bed liner of the present invention can easily be installed in a pickup truck having a top cap without disturbing the top cap fasteners, so as to provide a protective lining in a truck having a secure cargo hold area.

It is understood that the invention is not confined to the particular construction and arrangement of parts herein illustrated and described, but embraces such modified forms thereof as come within the scope of the following claims.

I claim:

1. A protective truck cargo bed liner of unitary vacuum formed plastic adapted to closely fit the contours of a truck cargo bed havng a floor, two side walls, two opposed side rails which extend inward from the upper edges of the two side walls, a front wall, a front rail, two rear wheel wells and a rear access opening defined in part by the floor and opposed side rails, said truck bed liner comprising:
   (a) a liner bottom wall adapted to fit on and substantially cover the full width of the truck cargo bed floor;
   (b) two liner wheel wells formed in the liner bottom wall at opposite sides thereof and adapted to accommodate the truck cargo bed rear wheel wells.
   (c) a liner front wall connected to and extending upwardly from the liner bottom wall, the liner front wall having an upper margin adapted to fit snugly against the truck cargo bed front wall; and
   (d) two liner side walls connected to the liner bottom wall and wheel wells and the liner front wall at opposite sides thereof, the liner front wall substantially limiting the distance between the liner side walls at the front end of the liner, each liner side wall projecting upwardly from the liner bottom wall and adjacent wheel well and having an upper margin adapted to fit snugly against the corresponding truck cargo bed wall beneath and substantially outwardly displaced from the inside margin of the corresponding truck cargo bed side rail, thereby providing an optimum volume of usable cargo space, said liner side walls being inclined outwardly from the liner bottom wall at an angle greater than perpendicular to permit nesting of the truck cargo bed liner with identical truck cargo bed liners in space efficient relation wherein the bottom walls of the nested liners are in proximity.

2. A liner as recited in claim 1 wherein the liner wheel wells have a top wall, inside wall, and two opposing end walls, said liner wheel well inside wall and end walls being inclined upwardly and rearwardly from the liner bottom wall at an angle sufficiently greater than perpendicular to permit nesting of the truck bed liner with identical truck bed liners in space efficient relation wherein the bottom walls of the nested liners are in proximity.

3. A protective truck cargo bed liner adapted to closely fit the contours of a truck cargo bed having a floor, two side walls, two opposed side rails which extend inward from the upper edges of the two side walls, a front wall, a front rail, two rear wheel wells and a rear access opening defined in part by the floor and opposed side rails, said truck bed liner comprising:

(a) a liner bottom wall adapted to fit on and substantially cover the full width of the truck cargo bed floor;

(b) two liner wheel wells formed in the liner bottom wall at opposite sides thereof and adapted to accommodate the truck cargo bed rear wheel wells;

(c) a liner front wall connected to and extending upwardly from the liner bottom wall, the liner front wall having an upper margin adapted to fit snugly against the truck cargo bed front wall; and (d) two liner side walls connected to the liner bottom wall and wheel wells and the liner front wall at opposite sides thereof, the liner front wall substantially limiting the distance between the liner side walls at the front end of the liner, each liner side wall projecting upwardly from the liner bottom wall and adjacent wheel well and having an upper margin adapted to fit snugly against the corresponding truck cargo bed wall beneath the corresponding truck cargo bed side rail, thereby providing an optimum volume of usable cargo space, said liner side walls being inclined outwardly from the liner bottom wall at an angle greater than perpendicular, wherein each liner side wall has a plurality of adjacent, longitudinally extending corrugations to provide lateral stiffness and resistance to bending stresses, and wherein the vertical height of the individual corrugations is substantially equal to the maximum thickness of the bottom wall, whereby the liner may be fully nested with identical liners with the bottom walls and successive corrugations of successive liners respectively in supporting contact.

4. A liner as recited in claim 3, wherein each liner side wall rises upwardly and outwardly from the liner bottom wall at an angle of not more than about 12° greater than perpendicular.

5. A liner as recited in claim 3 wherein the liner bottom wall contains a plurality of longitudinally extending corrugations and wherein the maximum bottom surface to top surface thickness of the bottom wall corrugations is substantially equal to the vertical height of the individual side wall corrugations.

6. A liner as recited in claim 3, wherein the height of the individual liner side wall corrugations and the thickness of the liner bottom wall are not more than approximately ⅜ inch, and wherein each liner side wall rises upwardly and outwardly from the liner bottom wall at an angle of not more than about 8° 30".

7. A liner as recited in claim 1, wherein the liner bottom wall has a planar apron portion at the rear margin thereof adapted to fit snugly against the truck cargo bed floor adjacent the rear access opening to keep foreign material from entering between the liner and the truck bed.

8. A liner as recited in claim 1 wherein each liner side wall has a plurality of adjacent, longitutdinally extending corrugations to provide lateral stiffness and resistance to bending stresses, and wherein the vertical height of the individual corrugations is less than an inch whereby the liner may be fully nested with identical liners with the successive corrugations of successive liners in supporting contact.

9. A liner as recited in claim 1 wherein the plastic is high density polyethylene.

10. A liner as recited in claim 1, wherein the upper margins of the liner side walls are substantially co-planar with the liner side walls and devoid of substantial transverse flanges to permit the liner side walls to bend outwardly in a limited manner, whereby the spacing of the liner side walls near the front of the liner will be maintained by the attached liner front wall but more rearwardly portions of the liner side walls will be permitted to open outwardly a limited amount when not restrained within the truck cargo bed to facilitate full nesting of the liner with identical liners.

11. A liner as recited in claim 10, wherein the liner wheel well inside wall is formed to incline upwardly from the liner bottom wall at an angle of between 2° to 5° greater than perpendicular and wherein the forward-facing liner wheel well end wall is formed to incline upwardly and rearwardly from the liner bottom wall at an angle sufficiently greater than perpendicular to permit nesting of the truck cargo bed liners with identical truck cargo bed liners in space-efficient relation wherein the bottom walls of the nested liners are in proximity.

12. A liner as recited in claim 3, wherein the outside surface of each liner side wall is comprised of a plurality of three-edged longitudinally extending corrugations each having a middle edge lying in the plane of the liner side wall with the other two edges extending outwardly from opposite margins of the associated middle edge at an angle of about 30° with respect to the plane of the middle edges, the outwardly extending edges of the corrugations intersecting the outwardly extending edges of adjacent corrugations to define the margins of the adjacent corrugations.

13. A liner as recited in claim 12, wherein the plane of each liner side wall is formed to extend upwardly and outwardly from the liner bottom wall at an angle of not more than approximately 12° greater than perpendicular.

14. A liner as recited in claim 12 wherein the vertical height of each longitudinally extending liner side wall corrugation is approximately ⅜ inch.

15. A liner as recited in claim 12 wherein the inside surface of each liner side wall comprises a plurality of adjacent, scalloped longitudinally extending corrugations which generally conform to the shape of the liner side wall outside surface, whereby when the liner is nested with an identical liner the corrugations of the side wall outside surface of the upper liner will substantilly correspond to and bear against the conforming shape of successive corrugations of the side wall inside surface of the lower liner in supporting relation.

16. A liner as recited in claim 1, wherein the liner side walls include a plurality of pockets which each extend inwardly a sufficient distance to pass around a stake channel formed in the truck cargo bed, and wherein the front facing and inwardly facing surfaces of the pockets are sufficiently inclined to permit nesting of the liner with an identical liner.

17. A liner as recited in claim 16, wherein the plurality of pockets include a front pocket, a side pocket, and a rear pocket, and wherein the inwardly facing surfaces of the side pockets are inclined upwardly and outwardly approximately at least 2° greater than perpendicular with reference to the liner bottom wall, and wherein the inwardly facing surfaces of the front pockets are inclined rearwardly at least 8°30' greater than perpendicular.

18. A liner as recited in claim 1, wherein a selected coating material having an effectively high co-efficient of friction is co-formed with the upper surface of the plastic forming the liner to provide a non-skid coating thereon, the non-skid coating being in the form of a film of elastomer integrally adhered to the liner upper surface.

19. A liner as recited in claim 6, wherein the outside surface of each liner side wall is comprised of a plurality of three-edged longitudinally extending corrugations each having a middle edge lying in the plane of the liner side wall with the other two edges extending outwardly from opposite margins of the associated middle edge at an angle of about 30° with respect to the plane of the middle edges, the outwardly extending edges of the corrugations intersection the outwardly extending edges of adjacent corrugations to define the margins of the adjacent corrugations, and wherein the inside surface of each liner side wall comprises a plurality of adjacent, scalloped longitudinally extending corrugations which generally conform to the shape of the liner side wall outside surface, whereby when the liner is nested with an identical liner the corrugations of the side wall outside surface of the upper liner will substantially correspond to and bear against the conforming shape of successive corrugations of the side wall inside surface of the lower liner in supporting relation.

20. A liner as recited in claim 1 wherein the liner side walls have outwardly stepped portions to accomodate the shape of the truck cargo bed side wall, and wherein the liner side wall portions above and below the outwardly stepped portions are inclined outwardly from the liner bottom wall at an angle greater than perpendicular.

21. A protective truck cargo bed liner adapted to closely fit the contours of a truck cargo bed having a floor, two side walls, two opposed side rails which extend inward from the upper edges of the two side walls, a front wall, a front rail, two rear wheel wells and a rear access opening defined in part by the floor and opposed side rails, said truck bed liner comprising:
  (a) a liner bottom wall adapted to fit on and substantially cover the full width of the truck cargo bed floor;
  (b) two liner wheel wells formed in the liner bottom wall at opposite sides thereof and adapted to accommodate the truck cargo bed rear wheel wells;
  (c) a liner front wall connected to and extending upwardly from the liner bottom wall, the liner front wall having an upper margin adapted to fit snugly against the truck cargo bed front wall; and
  (d) two liner side walls connected to the liner bottom wall and wheel wells and the liner front wall at opposite sides thereof, the liner front wall substantially limiting the distance between the liner side walls at the front end of the liner, each liner side wall projecting upwardly from the liner bottom wall and adjacent wheel well and having an upper margin adapted to fit snugly against the corresponding truck cargo bed wall beneath the corresponding truck cargo bed side rail, thereby providing an optimum volume of usable cargo space, said liner side walls being inclined outwardly from the liner bottom wall at an angle greater than perpendicular, wherein the liner side walls have outwardly stepped portions to accommodate the shape of the truck cargo bed side wall, and wherein the liner side wall portions above and below the outwardly stepped portions are inclined outwardly from the liner bottom wall at an angle greater than perpendicular and contain a plurality of longitudinally extending corrugations to provide lateral stiffness and resistance to bending stresses, and wherein the vertical height of the individual corrugations is substantially equal to the maximum vertical thickness of the bottom wall, whereby the liner may be fully nested with identical liners with the bottom walls and successive corrugations of successive liners in supporting contact.

* * * * *

Disclaimer 4,592,583.—*William L. Dresen*, Baraboo; *William F. Price*, Portage; *Phillip L. Emery*, Portage; *Harlan W. Breezer*, Portage, all of Wis. TRUCK CARGO BED LINER. Patent dated June 3, 1986. Disclaimer filed June 3, 1986, by the assignee, *Penda Corp.*

Hereby enters this disclaimer to claim 18 of said patent.

[*Official Gazette August 26, 1986.*]

UNITED STATES PATENT AND TRADEMARK OFFICE
CERTIFICATE OF CORRECTION

PATENT NO. : 4,592,583

DATED : June 3, 1986

INVENTOR(S) : William L. Dresen, William F. Price, Phillip L. Emery, Harlan W. Breezer It is certified that error appears in the above-identified patent and that said Letters Patent are hereby corrected as shown below:

In the description of the prior art, column 1, line 38, "patenht" should read --patent--.

In the claims, column 11, line 16, "intersection" should read --intersecting--.

Signed and Sealed this

Thirteenth Day of January, 1987

Attest:

DONALD J. QUIGG

*Attesting Officer*     *Commissioner of Patents and Trademarks*